United States Patent [19]

Hayami et al.

[11] 4,124,631
[45] Nov. 7, 1978

[54] PROCESS FOR THE PRODUCTION OF AROMATIC NITRILES

[75] Inventors: Hiroshi Hayami; Hitoshi Shimizu, both of Takasaki, Japan

[73] Assignee: Nippon Kayaku Kabushiki Kaisha, Tokyo, Japan

[21] Appl. No.: 776,199

[22] Filed: Mar. 10, 1977

[30] Foreign Application Priority Data

Jan. 14, 1977 [JP] Japan .................................. 52-3275

[51] Int. Cl.² .......................................... C07C 120/14
[52] U.S. Cl. .......................... 260/465 C; 260/465 G; 252/435; 252/437
[58] Field of Search ........................ 260/465 C, 465 G

[56] References Cited

U.S. PATENT DOCUMENTS

| | | | |
|---|---|---|---|
| 2,499,055 | 2/1950 | Cosby et al. | 260/465 C |
| 2,838,558 | 6/1958 | Hadley et al. | 260/465 C |
| 3,370,081 | 2/1968 | Sennewald et al. | 260/465 C |

Primary Examiner—Dolph H. Torrence
Attorney, Agent, or Firm—Russell & Nields

[57] ABSTRACT

A process for the production of aromatic nitrile having the formula (I)

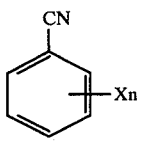

wherein X represents a chlorine, bromine, iodine or fluorine atom and $n$ is 1 or 2, by contacting aromatic compound having the formula (II)

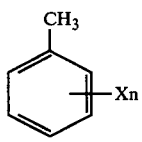

wherein X and $n$ are as defined above, with ammonia and molecular oxygen in the vapor phase in the presence of a catalyst having the following composition:

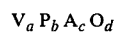

$$V_a P_b A_c O_d$$

wherein A denotes at least one element selected from the group consisting of chromium, manganese, iron, cobalt, nickel and tin, the subscripts $a$, $b$, $c$, and $d$ respectively denote the numbers of vanadium, phosphorus, A and oxygen atoms, and wherein $a$ is 1, $b$ is 0.1 to 3, $c$ is 0 to 2 and $d$ is a number determined by the valences of other elements.

10 Claims, No Drawings

PROCESS FOR THE PRODUCTION OF AROMATIC NITRILES

DETAILED DESCRIPTION OF THE INVENTION

This invention relates to a process for the production of aromatic nitrile.

More particularly, this invention relates to a process for the production of aromatic nitrile having the formula (I)

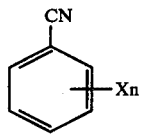  (I)

wherein X represents a chlorine, bromine, iodine or fluorine atom and $n$ is 1 to 2, by contacting aromatic compound having the formula (II)

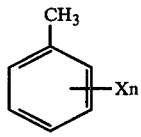  (II)

wherein X and $n$ are as defined above, with ammonia and molecular oxygen in the vapor phase in the presence of a catalyst having the following composition:

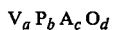

wherein A denotes at least one element selected from the group consisting of chromium, manganese, iron, cobalt, nickel and tin, the subscripts $a$, $b$, $c$ and $d$ respectively denote the numbers of vanadium, phosphorus, A and oxygen atoms, and wherein $a$ is 1, $b$ is 0.1 to 3, $c$ is 0 to 2 and $d$ is a number determined by the valences of other elements and is from 2.75 to 16.

The present invention also includes supplying to the reaction system a phosphorus-containing compound.

Recently, the demand for the aromatic nitrile having the formula (I) is increasing in the fields of dyes, agricultural chemicals, etc. Therefore, the industrial production of the aromatic nitrile having the formula (I) is a serious matter.

For the synthesis of aromatic nitrile by contacting alkyl substituted aromatic compound with ammonia and oxygen in a vapor phase a number of catalysts have hitherto been proposed.

For example, U.S. Pat. No. 2,838,558 discloses a catalyst of vanadium oxide deposited on alumina.

As to the aromatic compound having the formula (II), this aromatic compound has active chlorine, bromine, iodine or fluorine atom. Especially chlorine, bromine, iodine or fluorine atom at the ortho position is most active.

Thus, with respect to the ammoxidation of the aromatic compound having the formula (II) to the aromatic nitrile having the formula (I), most catalysts that are used for the ammoxidation of toluene to benzonitrile are unsatisfactory. Because, the aromatic compound having the formula (II) has said active atom and, therefore, the activities of most catalysts used for the ammoxidation of toluene to benzonitrile are too strong and the degradation of the aromatic ring and release of halogen caused by excessive oxidation occur. Thus, as to the ammoxidation of aromatic compound having the formula (II), it is very difficult to obtain aromatic nitrile having the formula (I) with a high yield and with a high purity.

It is the object of the present invention to overcome the above-described disadvantages of the prior art.

According to the present invention, although the aromatic compound having the formula (II) has active chlorine, bromine, iodine or fluorine atom, it is possible to obtain the aromatic nitrile having the formula (I) in high yields and in high purity.

The catalyst to be used in the present invention produces the aromatic nitrile having the formula (I) in high yield and in high purity without containing said A component. However, the yield and the purity of said aromatic nitrile can further be heightened by adding said A component to the catalyst.

A preferred catalyst according to the present invention has a composition which satisfies the following ratios:

$$a:b:c:d = 1:0.3-2.5:0.05-1.5:3.3-13.3$$

The catalyst according to the present invention can be prepared in the conventional manner known in the art, for example, by mixing compounds containing the component elements in the presence of water, drying and then calcining the dried product at a temperature of 350° to 900° C, and preferably 450° to 600° C.

The compounds of the component elements include various compounds.

Typical examples of the compounds of the component elements which may be used in the preparation of the catalyst are as follows;

vanadium compounds: ammonium metavanadate, vanadium pentoxide, vanadium oxalate, vanadium phosphate and the like;

phosphorus compounds: phosphoric acid, phosphate, hypophosphorous acid, phosphorus pentoxide and the like;

chromium, manganese, iron, cobalt, nickel and tin compounds: nitrates, hydrochlorides, acetates, sulfates, oxides, hydroxides, phosphates and chlorides of these elements, ammonium salt and the like.

While the catalyst of the present invention may be used without a carrier, the catalyst may also include a carrier, chiefly with a view to lowering the catalyst concentration, increasing the catalyst strength and enhancing the economy of the catalyst.

Examples of carriers which may be used include alumina, silica, beryllia, magnesia, titania, asbestos, diatomaceous earth, zeolite, silicon carbide, and the like.

The catalyst of the present invention may be used in a fixed bed, in a fluidized bed or in a moving bed.

The catalyst of the present invention has a long service life.

However, this catalyst as such is not completely satisfactory, because a part of phosphorus which is one of the essential components of the catalyst, though in a very small amount, leaves the catalyst system during the reaction and in consequence the semi-eternal life cannot be attained.

It is also found that the catalyst can be stabilized and its service life can further be prolonged by continuously or intermittently supplementing phosphorus in an appropriate amount corresponding to that of the phosphorus which leaves the catalyst system.

The process of the present invention is epoch-making and of great commercial value since aromatic nitrile having the formula (I) can be selectively produced in high yield and in high purity for long periods of time.

The phosphorus-containing compound is supplied to the reaction system with a view to supplementing phosphorus in an appropriate amount corresponding to that of the phosphorus which leaves the catalyst system. Said phosphorus-containing compound includes various compounds such as phosphoric acid, phosphorus pentoxide, phosphorous acid, mono-, di- or tri-alkyl phosphite, mono-, di- or trialkylphosphine, mono-, di- or tri-alkyl phosphate such as trimethyl phosphate and the like.

The most preferred phosphorus-containing compound is trialkyl phosphate such as trimethyl phosphate, triethyl phosphate, tripropyl phosphate, tributyl phosphate, etc.

When the ammoxidation reaction is carried out with supplying trialkyl phosphate continuously or intermittently to the reaction system, not only the service life of the catalyst can further be prolonged but also the yield of the aromatic nitrile can further be heightened.

To the reaction system the phosphorus-containing compound may be supplied in any suitable manner. For example, phosphorus-containing compound may be dissolved in water and/or aromatic compound to be used for the reaction so that it is carried to the reaction system along with water and/or aromatic compound.

If the phosphorus-containing compound is gaseous, a gaseous mixture of the same and air may be fed to the catalyst layer.

The amount of the phosphorus-containing compound to be supplied may vary over a wide range. The preferred amount of the phosphorus-containing compound to be supplied is the amount which can supplement the amount of phosphorus which leaves the catalyst system. The amount of the phosphorus-containing compound may be varied depending upon such factors as the reaction condition, the composition of the catalyst etc. In general, the phosphorus-containing compound is supplied so that the amount of phosphorus-containing compound is preferably 2 to 100 wt %, more preferably 5 - 40 wt % on the basis of total amount of used catalyst per year. Or, the phosphorus-containing compound is supplied so that the amount of phosphorus-containing compound is preferably 0.01 to 10 wt %, more preferably 0.02 to 2 wt % on the basis of the aromatic compound having the formula (II) fed. The supply of phosphorus-containing compound may be either intermittent or continuous.

Typical instances of the aromatic compound having the formula (II) include
o-, m- or p-chlorotoluene,
o-, m- or p-bromotoluene,
o-, m- or p-iodotoluene,
o-, m- or p-fluorotoluene,
2,3-, 2,4-, 2,5- or 2,6-dichlorotoluene,
2,3-, 2,4-, 2,5- or 2,6-dibromotoluene,
2,3-, 2,4-, 2,5- or 2,6-diiodotoluene, and
2,3-, 2,4-, 2,5- or 2,6-difluorotoluene.

The molar ratio of the aromatic compound having the formula (II), ammonia and molecular oxygen in the feed gas supplied to the reactor is preferably 1 : 1.5 – 15 : 1.5 – 20, more preferably 1 : 2 – 7 : 2.5 – 10.

The feed gas may contain inert gases such as nitrogen, carbon dioxide and carbon monoxide.

It is preferable that the feed gas contains steam. However, addition of steam to the feed gas is not essential in the present invention.

In general, the molar ratio of steam to the aromatic compound in the feed gas, when steam is added, is preferably 3 – 40 : 1, more preferably 5 – 20 : 1.

It is preferable that the amount of the aromatic compound having the formula (II) in the feed gas is generally 0.1 to 10 mol %, although the amount may be varied over a wide range.

The temperature for carrying out the ammoxidation reaction is not critical, but the reaction is preferably performed at a temperature of 300° to 650° C, more especially 350° to 550° C.

Under normal pressure and normal temperature contact time of the feed gas is preferably from 0.1 to 20 seconds, more preferably from 0.5 to 10 seconds.

The ammoxidation reaction can be carried out at atmospheric pressure or at increased or decreased pressure. A preferred range of pressure is 0.5 to 5 atm.

The present invention is illustrated by the following examples.

The respective definitions of the conversion, yield and selectivity are as follows:

Conversion (%) =

$$\frac{\text{number of moles of reacted aromatic compound having the formula (II)}}{\text{number of moles of fed aromatic compound having the formula (II)}} \times 100$$

Yield (%) =

$$\frac{\text{number of moles of formed aromatic nitrile having the formula (I)}}{\text{number of moles of fed aromatic compound having the formula (II)}} \times 100$$

Selectivity (%) =

$$\frac{\text{number of moles of formed aromatic nitrile having the formula (I)}}{\text{number of moles of reacted aromatic compound having the formula (II)}} \times 100$$

In the Examples the number of oxygen atom contained in the catalyst was not mentioned because it was a number determined by the valences of other elements.

EXAMPLE 1

117 g of ammonium metavanadate was suspended in 1 liter of water and was heated to obtain a solution. To this solution was added 116 g of phosphoric acid (85 wt %). Then the resultant mixture was heated to obtain a dark brown solution. The resultant solution was concentrated by heating to obtain pasty substance. Then the resultant pasty substance was mixed with 60 g of carborundum mechanically and evaporated to dryness. Thereafter, the dry product was calcined in the air at a temperature of 500° C for 6 hours. The catalyst thus obtained had the following composition.

$V_1 P_1 O_d$

The catalyst thus obtained was pulverized to 10 to 30 mesh. 30 ml of the catalyst was then placed in a fixed-bed reactor. A gaseous mixture comprising 2.4 mol % of o-chlorotoluene, 6.2 mol % of oxygen, 9.6 mol % of ammonia, 56.9 mol % of steam and 18.7 mol % of nitrogen was fed to the reactor with a contact time of 4.8 seconds and the reaction temperature was maintained at 450° C. The results are shown in Table 1.

EXAMPLES 2 - 3

By following the procedure as described in Example 1, there were obtained two catalysts having the composition shown in Table 1. Using these catalysts, the reactions were carried out under the same conditions as in Example 1. The results are shown in Table 1.

Table 1

| Example No. | Catalyst composition | Conversion of o-chlorotoluene (%) | Selectivity to o-chlorobenzonitrile (%) |
| --- | --- | --- | --- |
| 1 | $V_1 P_1 O_d$ | 93.2 | 73.9 |
| 2 | $V_1 P_{0.5} O_d$ | 97.8 | 71.3 |
| 3 | $V_1 P_2 O_d$ | 45.9 | 72.8 |

EXAMPLES 4 - 14

A number of catalysts having the composition shown in Table 2 were prepared in a manner similar to that described in Example 1 except that one or two of chromium, manganese, iron, cobalt, nickel and tin nitrates were added to the dark brown solution prior to the concentration by heating.

Using these catalysts, the reactions were carried out under the same conditions as in Example 1 except for the reaction temperature. The results are shown in Table 2.

Table 2

| Ex. No. | Catalyst composition | Reaction temperature (° C) | Conversion of o-chlorotoluene (%) | Selectivity to o-chlorobenzonitrile (%) |
| --- | --- | --- | --- | --- |
| 4 | $V_1 P_1 Cr_{0.15} O_d$ | 430 | 92.5 | 71.5 |
| 5 | $V_1 P_1 Mn_{0.15} O_d$ | 430 | 93.2 | 73.5 |
| 6 | $V_1 P_1 Fe_{0.15} O_d$ | 450 | 98.8 | 74.0 |
| 7 | $V_1 P_1 Co_{0.15} O_d$ | 450 | 97.8 | 73.8 |
| 8 | $V_1 P_1 Ni_{0.15} O_d$ | 450 | 96.8 | 71.5 |
| 9 | $V_1 P_1 Sn_{0.15} O_d$ | 450 | 97.8 | 70.1 |
| 10 | $V_1 P_2 Fe_1 O_d$ | 450 | 86.1 | 75.4 |
| 11 | $V_1 P_2 Co_1 O_d$ | 450 | 85.4 | 77.4 |
| 12 | $V_1 P_2 Sn_1 O_d$ | 440 | 76.7 | 68.7 |
| 13 | $V_1 P_1 Cr_{0.1} Mn_{0.1} O_d$ | 430 | 94.1 | 73.2 |
| 14 | $V_1 P_1 Fe_{0.1} Mn_{0.1} O_d$ | 430 | 95.3 | 74.4 |

EXAMPLE 15

117 g of ammonium metavanadate was suspended in 1 liter of water. To this suspension was added 30 g of oxalic acid slowly with heating to obtain a uniform solution. To this solution were added 116 g of phosphoric acid (85 wt %) and 61 g of cobalt nitrate dissolved in 500 ml of water. To the resultant solution was further added 55 g of $SiO_2$ with stirring. The resultant mixture was then evaporated to dryness. The cakey substance consequently obtained was pulverized to a particle size of 5 to 9 mesh and subjected to a calcination treatment at 550° C for 3 hours. The catalyst thus prepared had the following composition:

$$V_1 P_1 Co_{0.3} O_d$$

20 ml of the catalyst was placed in a fixed-bed reactor. A gaseous mixture consisting of 3.1 mol % of o-chlorotoluene, 9.3 mol % of oxygen, 12.4 mol % of ammonia, 37.9 mol % of steam and 37.3 mol % of nitrogen was fed to the reactor with a contact time of 3.0 seconds and the reaction temperature was maintained at 410° C. The results obtained after 5 hours are shown in Table 3.

EXAMPLES 16 - 20

A number of catalysts having the composition shown in Table 3 were prepared in a manner similar to that described in Example 15 except that an aqueous solution of manganese, iron, nickel, tin or chromium nitrate was used instead of an aqueous solution of cobalt nitrate.

Using these catalysts, the reactions were carried out under the same conditions as in Example 15 except for the reaction temperature. The results obtained after 5 hours are shown in Table 3.

EXAMPLE 21

A catalyst having the composition shown in Table 3 was prepared in a manner similar to that described in Example 15 except that cobalt nitrate was not added in this case.

Using this catalyst, the reaction was carried out under the same conditions as in Example 15 except for the reaction temperature. The results obtained after 5 hours are shown in Table 3.

Table 3

| Ex. No. | Catalyst composition | Reaction temperature (° C) | Conversion of o-chlorotoluene (%) | Yield of o-chlorobenzonitrile (%) | Selectivity to o-chlorobenzonitrile (%) |
| --- | --- | --- | --- | --- | --- |
| 15 | $V_1 P_1 Co_{0.3} O_d$ | 410 | 94.7 | 79.5 | 83.9 |
| 16 | $V_1 P_1 Mn_{0.3} O_d$ | 395 | 90.5 | 79.2 | 87.5 |
| 17 | $V_1 P_1 Fe_{0.3} O_d$ | 410 | 99.3 | 78.1 | 78.7 |
| 18 | $V_1 P_1 Ni_{0.3} O_d$ | 410 | 97.6 | 75.5 | 77.4 |
| 19 | $V_1 P_1 Sn_{0.3} O_d$ | 410 | 92.3 | 72.4 | 78.4 |
| 20 | $V_1 P_1 Cr_{0.3} O_d$ | 400 | 95.2 | 78.5 | 82.5 |
| 21 | $V_1 P_1 O_d$ | 420 | 95.4 | 76.1 | 79.0 |

EXAMPLES 22 - 28

The reactions described in Examples 15 - 21 were carried out for 2000 hours, while a phosphorus-containing compound was supplied to the reaction system.

As the phosphorus-containing compound was used trimethyl phosphate in the form of solution containing 0.1 wt % of trimethyl phosphate in O-chlorotoluene.

Thus, trimethyl phosphate was supplied to the reaction system so that the amount of trimethyl phosphate was 0.1 wt % on the basis of O-chlorotoluene.

The results are shown in Table 4.

Table 4

| Ex. No. | Catalyst composition | Reaction time (hours) | Reaction temperature (° C) | Conversion of o-chloro toluene (%) | Yield of o-chloro benzo nitrile (%) | Selectivity to o-chloro benzo nitrile (%) |
| --- | --- | --- | --- | --- | --- | --- |
| 22 | $V_1 P_1 Co_{0.3} O_d$ | 5 | 410 | 95.9 | 83.2 | 86.9 |
|  |  | 2000 | 410 | 95.5 | 83.7 | 87.6 |
| 23 | $V_1 P_1 Mn_{0.3} O_d$ | 5 | 395 | 91.5 | 82.5 | 90.2 |
|  |  | 2000 | 395 | 92.3 | 81.7 | 88.5 |
| 24 | $V_1 P_1 Fe_{0.3} O_d$ | 5 | 410 | 97.5 | 83.4 | 85.5 |
|  |  | 2000 | 410 | 99.1 | 80.2 | 80.9 |
| 25 | $V_1 P_1 Ni_{0.3} O_d$ | 5 | 410 | 97.7 | 79.9 | 81.8 |
|  |  | 2000 | 410 | 95.4 | 78.1 | 81.9 |
| 26 | $V_1 P_1 Sn_{0.3} O_d$ | 5 | 410 | 93.3 | 75.5 | 80.9 |
|  |  | 2000 | 410 | 95.5 | 78.0 | 81.7 |
| 27 | $V_1 P_1 Cr_{0.3} O_d$ | 5 | 400 | 95.3 | 83.5 | 87.6 |
|  |  | 2000 | 400 | 96.8 | 84.0 | 86.8 |
| 28 | $V_1 P_1 O_d$ | 5 | 420 | 95.5 | 79.7 | 83.5 |
|  |  | 2000 | 420 | 93.9 | 78.4 | 83.5 |

EXAMPLE 29

The reaction described in Example 15 was carried out for 2000 hours except that a phosphorus-containing compound was repeatedly supplied to the reaction system for 1 hour at 11-hour intervals.

As the phosphorus-containing compound was used trimethyl phosphate in the form of solution containing 1.5 wt % of trimethyl phosphate in O-chlorotoluene.

Thus, trimethyl phosphate was supplied to the reaction system so that the amount of trimethyl phosphate was 1.5 wt % on the basis of o-chlorotoluene.

The results obtained after 2000 hours were as follows.
  Conversion of o-chlorotoluene: 94.2%
  Yield of o-chlorobenzonitrile: 82.5%
  Selectivity to o-chlorobenzonitrile: 87.6%

EXAMPLE 30

The reaction described in Example 29 was carried out except that the supplies of o-chlorotoluene and ammonia were stopped when the phosphorus-containing compound was supplied to the reaction system.

As the phosphorus-containing compound was used trimethyl phosphate in the form of solution containing 0.8 wt % of trimethyl phosphate in water.

The results were nearly the same as those of Example 29.

EXAMPLE 31

The reactions were carried out in a manner similar to that described in Example 30 except that phosphoric acid, trimethyl phosphite, triethyl phosphate or monomethyl phosphate was used as the phosphorus-containing compound in place of trimethyl phosphate.

The results were nearly the same as those of Example 29.

EXAMPLE 32

The reaction described in Example 15 was carried out except that p-chlorotoluene was used in place of o-chlorotoluene. The contact time, the reaction temperature and the results were as follows.
  Contact time: 4.8 seconds
  Reaction temperature: 410° C
  Conversion of p-chlorotoluene: 98.4%
  Yield of p-chlorobenzonitrile: 89.5%
  Selectivity to p-chlorobenzonitrile: 90.9%

EXAMPLE 33

The reaction described in Example 15 was carried out except that o-fluorotoluene was used in place of o-chlorotoluene. The contact time, the reaction temperature and the results were as follows.
  Contact time: 4.8 seconds
  Reaction temperature 440° C
  Conversion of o-fluoretoluene: 95.7%
  Yield of o-fluorobenzonitrile: 84.7%
  Selectivity to o-fluorobenzonitrile: 88.5%

EXAMPLE 34

The reaction described in Example 15 was carried out except that o-bromotoluene was used in place of o-chlorotoluene. The contact time, the reaction temperature and the results were as follows.
  Contact time: 4.8 seconds
  Reaction temperature: 395° C
  Conversion of o-bromotoluene: 99.8%
  Yield of o-bromobenzonitrile: 83.3%
  Selectivity to o-bromobenzonitrile: 83.4%

EXAMPLE 35

The reaction described in Example 15 was carried out except that 2,4-dichlorotoluene was used in place of o-chlorotoluene. The contact time, the reaction temperature and the results were as follows.
  Contact time: 4.8 seconds
  Reaction temperature: 410° C
  Conversion of 2,4-dichlorotoluene: 97.6%
  Yield of 2,4-dichlorobenzonitrile: 80.8%
  Selectivity to 2,4-dichlorobenzonitrile: 82.7%

EXAMPLE 36

The reaction described in Example 15 was carried out except that o-iodotoluene was used in place of o-chlorotoluene. The contact time, the reaction temperature and the results were as follows.
  Contact time: 4.8 seconds
  Reaction temperature: 385° C
  Conversion of o-iodotoluene: 89.4%
  Yield of o-iodobenzonitrile: 65.0%
  Selectivity to o-iodobenzonitrile: 72.7%

What we claim is:

1. A process for the production of aromatic nitrile having the formula (I)

wherein X represents a chlorine, bromine, iodine or fluorine atom and $n$ is 1 or 2.
by contacting aromatic compound having the formula (II)

wherein X and $n$ are as defined above, with ammonia and molecular oxygen in the vapor phase in the presence of a catalyst having the following composition:

$$V_a P_b A_c O_d$$

wherein A denotes at least one element selected from the group consisting of chromium, manganese, iron, cobalt, nickel and tin, the subscripts $a$, $b$, $c$ and $d$ respectively denote the numbers of vanadium, phosphorus, A and oxygen atoms, and wherein $a$ is 1, $b$ is 0.1 to 3, $c$ is 0 to 2 and $d$ is a number determined by the valances of other elements.

2. The process according to claim 1, wherein $a$ is 1, $b$ is 0.3 to 2.5, $c$ is 0.05 to 1.5 and $d$ is a number determined by the valances of other elements.

3. The process according to claim 2, wherein A is cobalt.

4. The process according to claim 2, wherein A is chromium.

5. The process according to claim 2, wherein A is manganese.

6. The process according to claim 1, wherein aromatic compound having the formula (II) is o-chlorotoluene.

7. The process according to claim 1, wherein aromatic compound having the formula (II) is 2,6-dichlorotoluene.

8. The process according to claim 1, wherein a compound of phosphorus is supplied to the reaction system continuously or intermittently.

9. The process according to claim 8, wherein said compound of phosphorus is trialkyl phosphate.

10. The process according to claim 9, wherein trialkyl phosphate is trimethyl phosphate, triethyl phosphate, tripropyl phosphate or tributyl phosphate.

* * * * *